Feb. 3, 1942.  E. F. SALSBURY ET AL  2,271,805

SEAT SUPPORT

Filed Nov. 5, 1940

INVENTORS
ESLEY F. SALSBURY
LEWIS D. THOSTENSON
BY HARRIS, KIECH, FOSTER & HARRIS

ATTORNEYS.

Patented Feb. 3, 1942

2,271,805

UNITED STATES PATENT OFFICE 2,271,805

SEAT SUPPORT

Esley F. Salsbury, Los Angeles, and Lewis D. Thostenson, Inglewood, Calif., assignors to Salsbury Corporation, Inglewood, Calif., a corporation of California Application November 5, 1940, Serial No. 364,410

3 Claims. (Cl. 180—30)

Our invention relates to motor vehicles, and an object of the invention is to provide a seat support for such a vehicle. Further objects and advantages will be made evident hereinafter.

In the drawing, which is for illustrative purposes:

Figure 1:
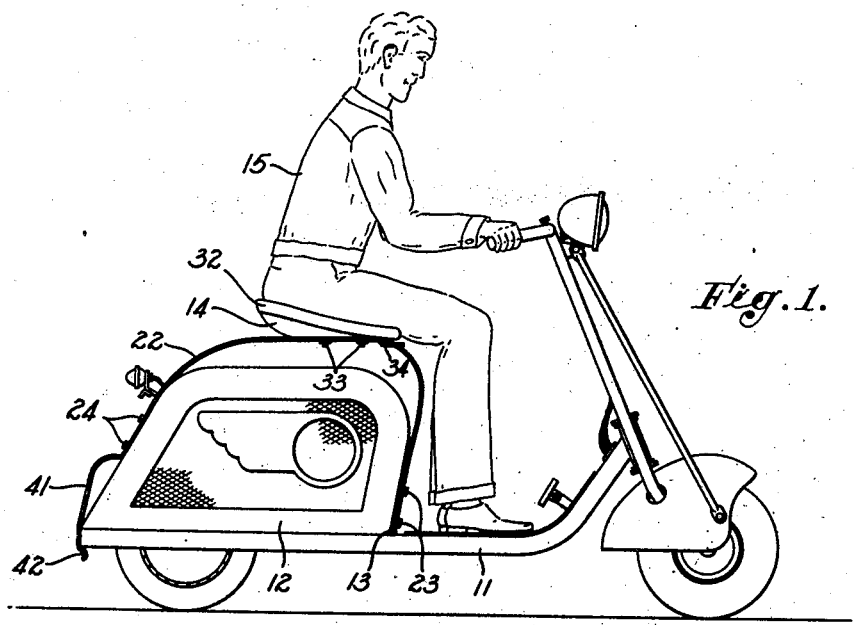
Fig. 1 is a utility view of a motor drive vehicle illustrating our invention.
Figure 4:
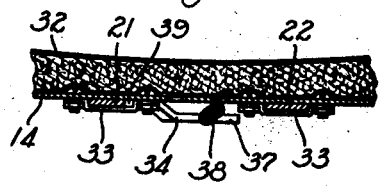
Fig. 4 is a fragmentary section taken on the line 4—4 of Fig. 3.
Figure 2:
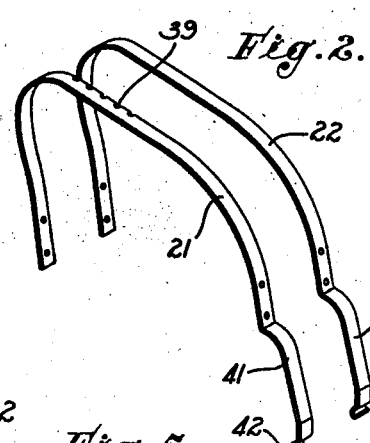
Fig. 2 is a perspective view of the seat support members.
Figure 3:
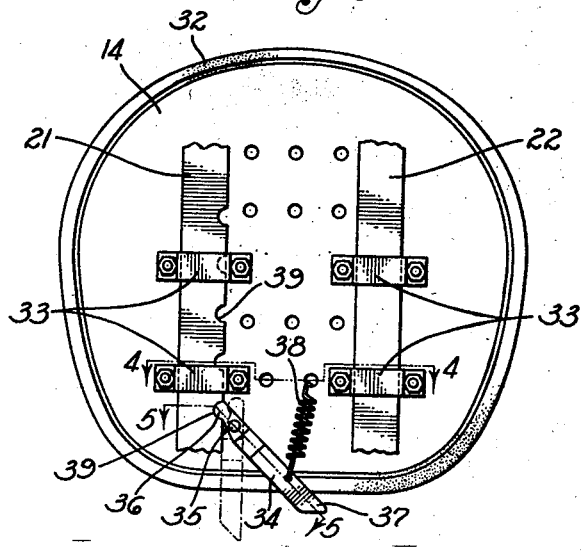
Fig. 3 is a bottom view of the seat illustrating the adjusting means.
Figure 5:
Fig. 5 is a fragmentary section taken on the line 5—5 of Fig. 3.

Our invention has utility when applied to a vehicle of the type shown in the drawing in which 11 is the frame of the vehicle and 12 is a hood which is preferably hinged at 13 to the frame 11. A seat 14 is provided upon which the rider 15 sits in the position shown. It is highly desirable that adequate springs be provided to support the weight of the rider, since these small wheeled vehicles respond very quickly and positively to inequalities in the road surface. To provide rider spring suspension, the seat is supported on a pair of spring steel members 21 and 22. Each of these members is bolted or riveted at 23 to the front of the hood and at 24 to the back of the hood. Each of the strips is bowed between the suspension points 23 and 24 so that it passes over the hood 12 at a sufficient distance from the hood to allow the spring members 21 and 22 full play.

The seat 14 is preferably made of sheet iron upon which is secured a cushion 32. Bolted on the bottom of the seat 14 are four straps 33 which enclose the members 21 and 22 in such a manner that the seat is free to slide longitudinally on the straps so that the seat may be adjusted forward and aft to suit the convenience of the rider. A lever 34 is pivoted on a pin 35 fixed on the seat 14, one end 36 of this lever being shaped to engage selectively notches 39 formed in the member 21, and the other end 37 projecting to a point where it is readily accessible to the rider. A tension spring 38 is secured to the lever 34 and to the seat 14 in such a manner as to force the end 36 into the notches 39. To adjust the seat 14, a rider takes hold of the end 37 of the lever 34 and moves it to the left. This action moves the end 36 free from one of the notches 39. The seat is then moved longitudinally forward or aft on the straps 21 and 22 to a position best suited to the rider, whereupon the lever 34 is released allowing the end 36 to engage one of the notches 39, thus locking the seat 14 against longitudinal movement.

In addition to acting as a seat support, the members 21 and 22 act as latches for the hood. The lower rear ends of the members 21 and 22 extend down beyond the point of attachment to the hood and are bent as shown in the drawing to form bumpers 41 which extend high enough to engage the bumpers on an automobile and thus protect the hood from blows from automobile bumpers. The extreme lower ends of both members 21 and 22 carry hooks 42 which lock under the frame 11 and hold the hood 12 against the frame.

We claim as our invention:

1. In a vehicle having a frame and a seat for the rider of said vehicle comprising: a hood covering the engine of said vehicle and supported on said frame; a pair of flat spring members each attached at one end to the back of said hood, attached at the other end to the front of said hood, and each having an intermediate portion between the points attached, said portions extending more or less parallel to the normal line of motion of said vehicle; and a seat secured to and supported on said intermediate portions.

2. In a vehicle having a frame and a seat for the rider of said vehicle comprising: a hood covering the engine of said vehicle and supported on said frame; a pair of flat spring members each attached at one end to the back of said hood, attached at the other end to the front of said hood, and each having an intermediate portion between the points attached, said portions extending more or less parallel to the normal line of motion of said vehicle; a seat supported on said intermediate portions in such a manner as to be free to slide longitudinally thereon; and means for locking said seat to one of said spring members.

3. In a vehicle having a frame and a seat for the rider of said vehicle comprising: a hood covering the engine of said vehicle and supported on said frame; a pair of flat spring members each attached at one end to the back of said hood, attached at the other end to the front of said hood, and each having an intermediate portion between the points attached, said portions extending more or less parallel to the normal line of motion of said vehicle; a seat supported on said intermediate portions in such a manner as to be free to slide longitudinally thereon; and means for locking said seat in any one of a plurality of positions longitudinally disposed on said spring members.

ESLEY F. SALSBURY.
LEWIS D. THOSTENSON.